(12) United States Patent
Bhardwaj (10) Patent No.: US 10,574,668 B2
(45) Date of Patent: *Feb. 25, 2020

(54) ANALOG SECURITY FOR DIGITAL DATA

(71) Applicant: AirWatch LLC, Atlanta, GA (US)

(72) Inventor: Ketan Bhardwaj, Atlanta, GA (US)

(73) Assignee: AIRWATCH LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/275,695

(22) Filed: Feb. 14, 2019

(65) Prior Publication Data

US 2019/0182264 A1    Jun. 13, 2019

Related U.S. Application Data

(63) Continuation of application No. 15/676,025, filed on Aug. 14, 2017, now Pat. No. 10,250,615, which is a continuation of application No. 14/880,679, filed on Oct. 12, 2015, now Pat. No. 9,736,171.

(51) Int. Cl.
*H04L 29/06* (2006.01)
*H04N 1/44* (2006.01)
*H04N 1/64* (2006.01)
*G06F 21/84* (2013.01)
*G06F 21/00* (2013.01)
*G06F 3/01* (2006.01)

(52) U.S. Cl.
CPC ............ *H04L 63/126* (2013.01); *G06F 21/00* (2013.01); *G06F 21/84* (2013.01); *H04L 63/0428* (2013.01); *H04L 63/08* (2013.01); *H04N 1/444* (2013.01); *H04N 1/448* (2013.01); *H04N 1/64* (2013.01); *G06F 3/011* (2013.01); *G06F 2221/032* (2013.01)

(58) Field of Classification Search
CPC ..... H04L 63/126; H04L 9/0428; H04L 63/08; H04N 1/448; H04N 1/444; H04N 1/64; G06F 21/00; G06F 2212/032; G06F 21/84; G06F 3/011
See application file for complete search history.

(56) References Cited

U.S. PATENT DOCUMENTS

2006/0177060 A1* 8/2006 Johnson ................... G09C 5/00
380/255
2011/0264922 A1* 10/2011 Beaumont ............... G06F 21/84
713/189

* cited by examiner

*Primary Examiner* — Tri M Tran
(74) *Attorney, Agent, or Firm* — Thomas | Horstemeyer, LLP (57) ABSTRACT

Disclosed are various examples of providing analog security for digital data. A first framelet is decrypted. The first framelet includes a first set of subpixels for each pixel of content requested from a network service. A second framelet is also decrypted. The second framelet includes a second set of subpixels for the respective pixel of the content. The first framelet and the second framelet are rendered separately. The first framelet is visually aligned with the second framelet to reproduce the content. A shade of each pixel is reproduced based on the first plurality of subpixels being visually aligned with the second plurality of subpixels.

20 Claims, 7 Drawing Sheets

ANALOG SECURITY FOR DIGITAL DATA

CROSS-REFERENCE TO RELATED APPLICATIONS

This application claims priority to and the benefit of the following applications, as a continuation of co-pending application Ser. No. 15/676,025, filed on Aug. 14, 2017, and entitled "Analog Security for Digital Data," which is a continuation of application Ser. No. 14/880,679, filed on Oct. 12, 2015, and entitled "Analog Security for Digital Data," all of which are incorporated herein by reference in their entireties.

BACKGROUND

Data that has been secured in its digital form (e.g. encrypted, access restricted according to one or more permissions, or similarly protected) can still be surreptitiously accessed in its analog form. For example, a video that has been protected with various digital rights management (DRM) technologies can be recorded (for example, with a video camera) while being displayed on a screen. Similarly, the contents of a sensitive document on a screen could be viewed by an unauthorized party while it is being viewed by an authorized party (e.g. shoulder surfing).

These types of gaps are often referred to as the "analog hole." If a sound can be heard by an ear, it can be recorded by a microphone. Likewise, if text, images, or video can be seen by the eye, they can be recorded by a camera. Historically, analog-to-digital conversion equipment has produced digital qualities of lower fidelity than the analog copy they are attempting to replicate. Further, this equipment tended to be bulky and therefore noticeable. These factors tended to limit the viability of exploiting the analog hole to gain access to secure information. However, cameras and other recording equipment have continued to decrease in size and increase in recording capabilities to the point where individuals can create high-quality copies of the analog presentation of secured data without being noticed. For example, a modern smartphone is often small enough to fit into the palm of someone's hand and includes both a high-resolution camera capable of capturing images with tens-of-millions of pixels and a high-fidelity microphone, allowing someone to photograph a display or record a conversation while standing next to the viewer or listener without being noticed.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various examples for providing analog security for digital data. Users may have content, such as images, videos, or visual representations of documents (e.g. emails, reports, studies, presentations, memorandums, letters, and similar documents) split into multiple components. Each component, when viewed by itself, is indecipherable such that a user cannot identify the content when viewing an individual framelet. However, when multiple framelets are correctly aligned with respect to each other (e.g. overlaid over each other), the content becomes visible to the user.

Sending different framelets to different devices would therefore secure data in the event that a single device is stolen, lost, or otherwise misplaced. Further, it would ensure that only a user who has simultaneous access to all of the devices can view the protected content. For example, if a first framelet is sent to a mobile computing device (e.g. a tablet computer or smartphone) and a second framelet is sent to a wearable computing device (e.g. augmented reality glasses or similar devices), then only an individual who can view the framelet on the mobile computing device using the wearable computing device would be able to view the content, as further illustrated in the following figures.

Figure 1A:
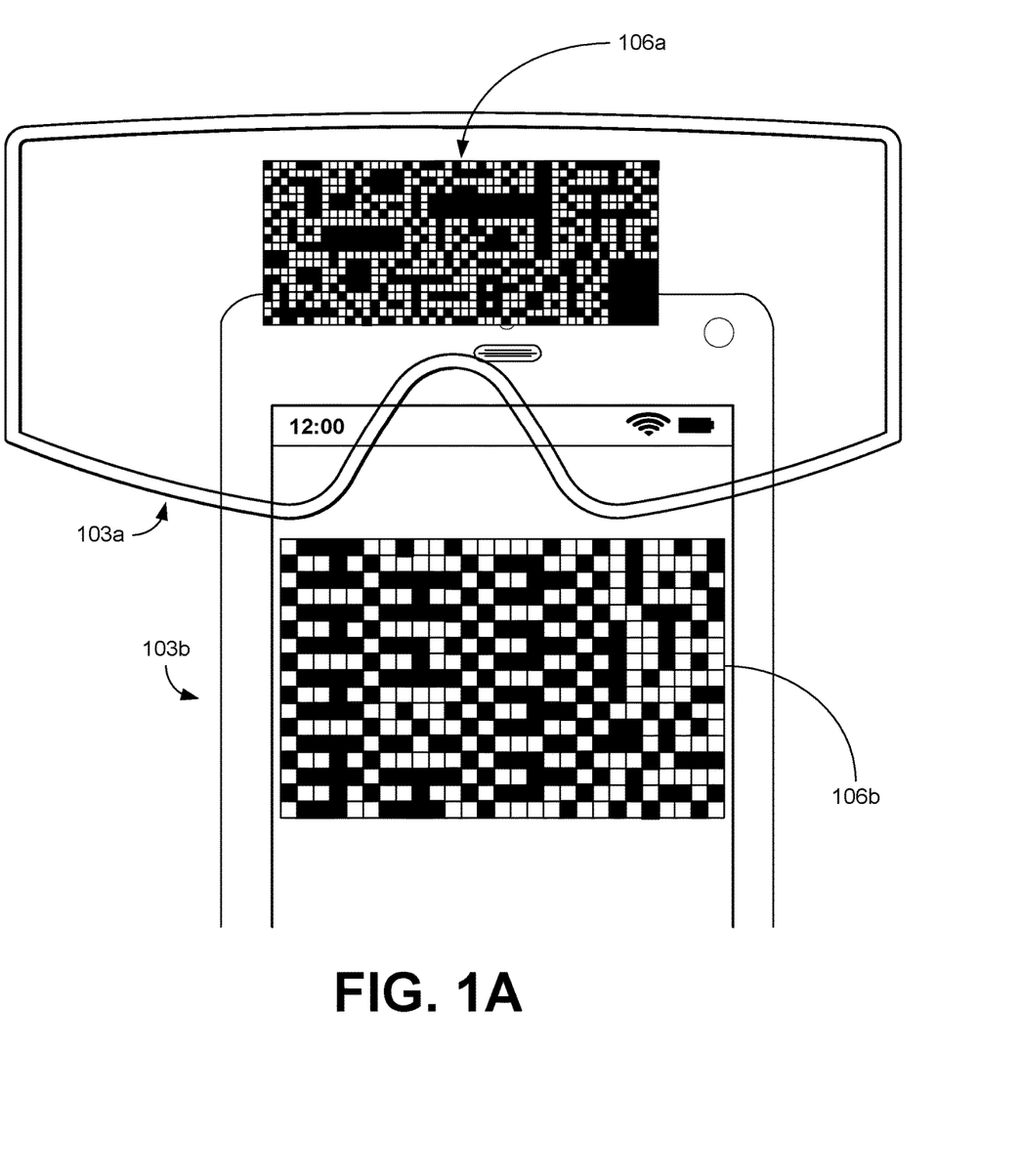
FIGS. 1A and 1B are drawings depicting the operation of various examples of the disclosure.

With reference to FIG. 1A, shown is an example of the operation of an example of the disclosure. Here, a user has a first client device 103a and a second client device 103b. As illustrated, the first client device 103a corresponds to an augmented reality headset, such as an optical head-mounted display (e.g. Google Glass®) or similar device. The second client device 103b corresponds to a mobile computing device with a display, such as a smartphone, tablet computer, or similar device. However, the second client device 103b can correspond to any computing device with a display, including a desktop computer, a laptop computer, a smart television, a video game console, a media player (e.g. a DVD player or Blu-Ray® player), or similar device. A first framelet 106a of content is displayed or otherwise rendered on the first client device 103a. A second framelet 106b is displayed on the screen of the second client device 103b.

Each framelet 106 can represent a portion of content to be viewed by the user. For example, if a user wishes to view an image or read a page of a document, each framelet 106 can represent a portion of the content to be displayed. Each framelet 106, when viewed by itself, should be indecipherable and provide little, if any, information regarding any of the remaining framelets 106 of the content. Each framelet 106 can be generated using one of the various techniques described below. When the framelets 106 are overlaid over each other to be viewed, the content is able to be viewed by the user.

Figure 1B:
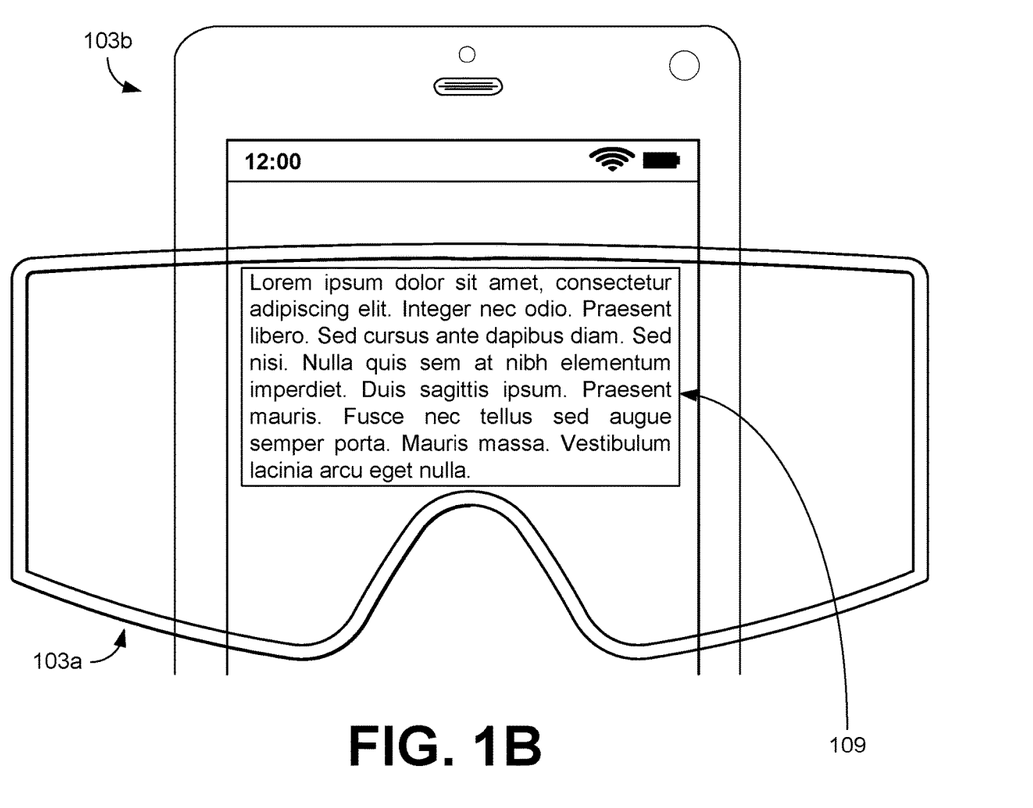

With reference to FIG. 1B, the first client device 103a and the second client device 103b are aligned by the user such that the first framelet 106a and the second framelet 106b of the content are substantially overlaid on top of each other when viewed by the user through the first client device 103a. When the first framelet 106a and the second framelet 106b are overlaid, a clear text version 109 of the content can be viewed by the user. After the user has finished viewing the content, the user can render the content unviewable by simply moving their head, and thus the first client device 103a, or repositioning the second client device 103b so that the first framelet 106a and the second framelet 106b are no longer aligned with each other. So long as the first framelet 106a and the second framelet 106b are not aligned in an overlaid manner, the content will continue to be unviewable.

Figure 2A:
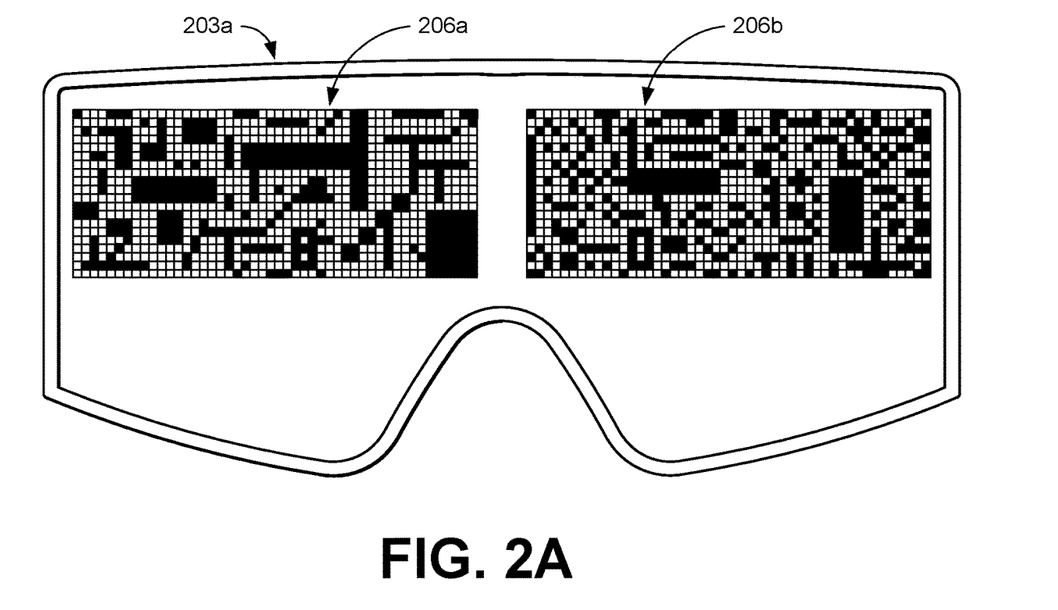
FIGS. 2A and 2B are drawings depicting the operation of various examples of the disclosure.
Figure 2B:
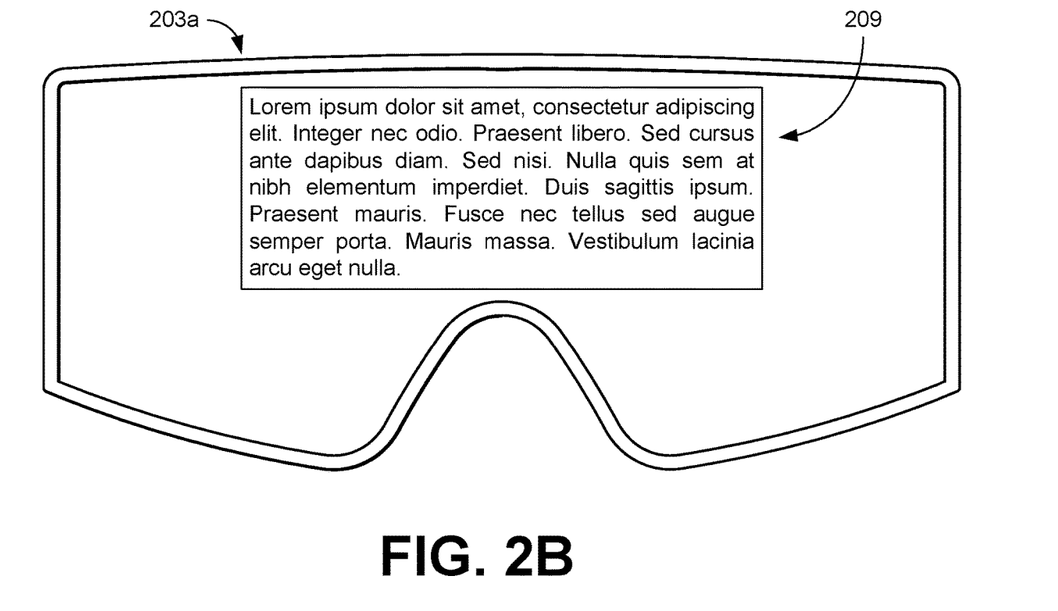

With reference to FIGS. 2A and 2B, shown is another example of the operation of various implementations of the disclosure. Here, a first framelet 206a and a second framelet 206b are rendered on a display of a client device 203a. The client device 203a corresponds to an augmented reality headset, such as an optical head-mounted display (e.g. Google Glass®) or similar device. As previously discussed, each framelet 206 represents a portion of content, but must be correctly aligned in order for a user to view the content. Here, the first framelet 206a and the second framelet 206b are displayed on separate halves of the client device 203a, such that first framelet 206a is only visible to the left eye and the second framelet 206b is only visible to the right eye. Due to stereopsis, the visual system of a user's brain will reassemble the first framelet 206a and the second framelet 206b into the original content, while an individual who is not wearing the augmented reality headset would only be able to view the two separate framelets 206 due to the difference in position.

Figure 3:
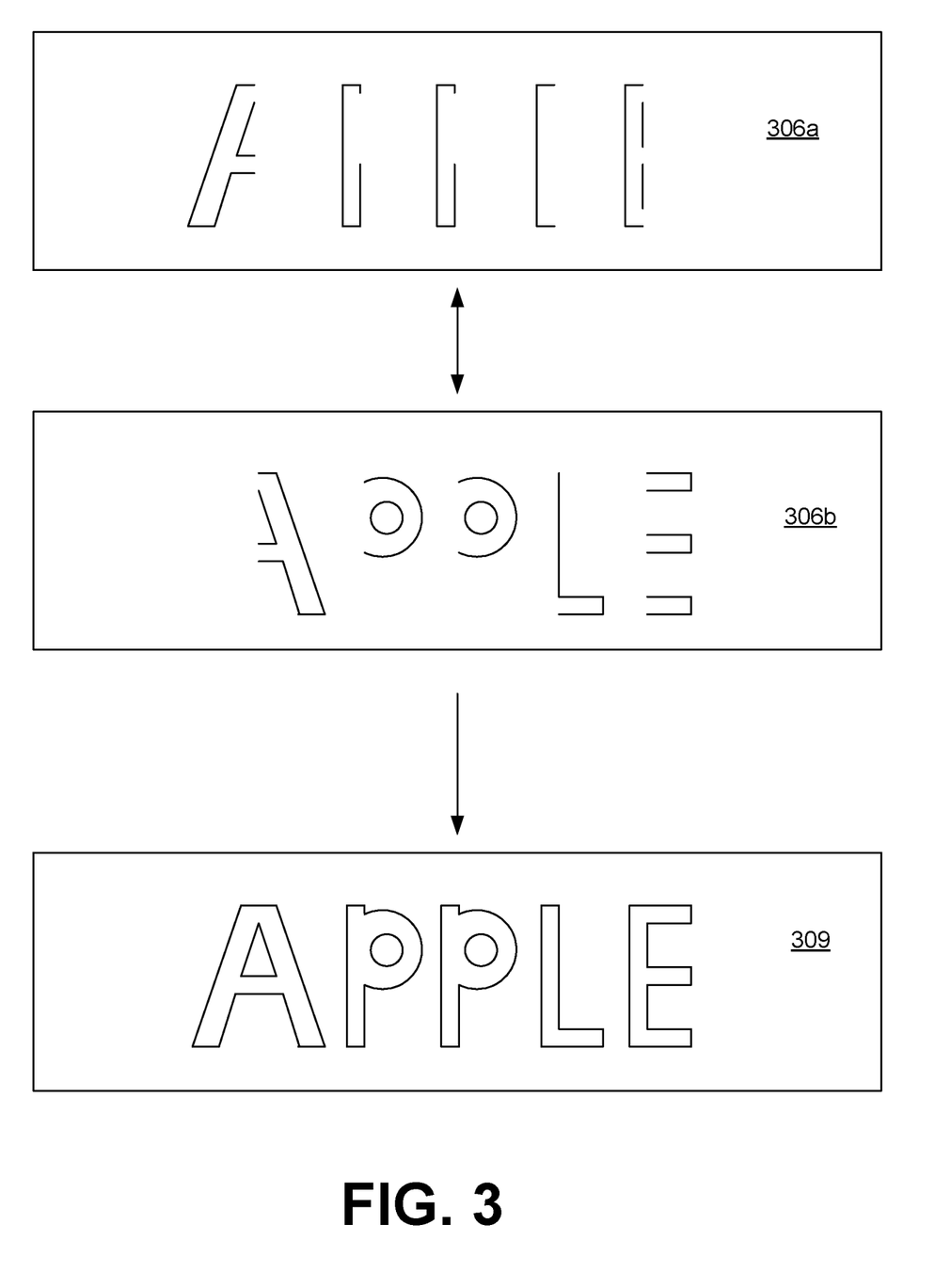
FIG. 3 is a drawing depicting the operation of various examples of the present disclosure.

With reference to FIG. 3, shown is another example various visual cryptographic techniques. Here, text has been split into two framelets. A first framelet 306a contains the left half of all letters in a sequence of text (e.g. a document). The second framelet 306b contains the right half of all letters in the same sequence of text. When the first framelet 306a and the second framelet 306b are overlaid over each other, a clear text version 309 of the sequence of text can be viewed by the user.

It should be noted that FIGS. 1A, 1B, 2A, 2B, and 3 are intended to illustrate the principles used to provide analog security for digital data. Many variations of the techniques discussed above can be used in the various examples discussed below. For example, content could be converted into more than two framelets to provide additional security. As another example, the content could be divided into the framelets in other ways than those illustrated above. For example, the technique illustrated in FIG. 3 could be modified such that the first framelet 306a and the second framelet 306b include a random assortment of left halves and right halves of letters in a sequence of text. In addition, the various approaches discussed could be chained together or otherwise in conjunction with each other to provide additional layers of protection. Any and all variations of these approaches are considered to be within the scope of this disclosure.

Figure 4:
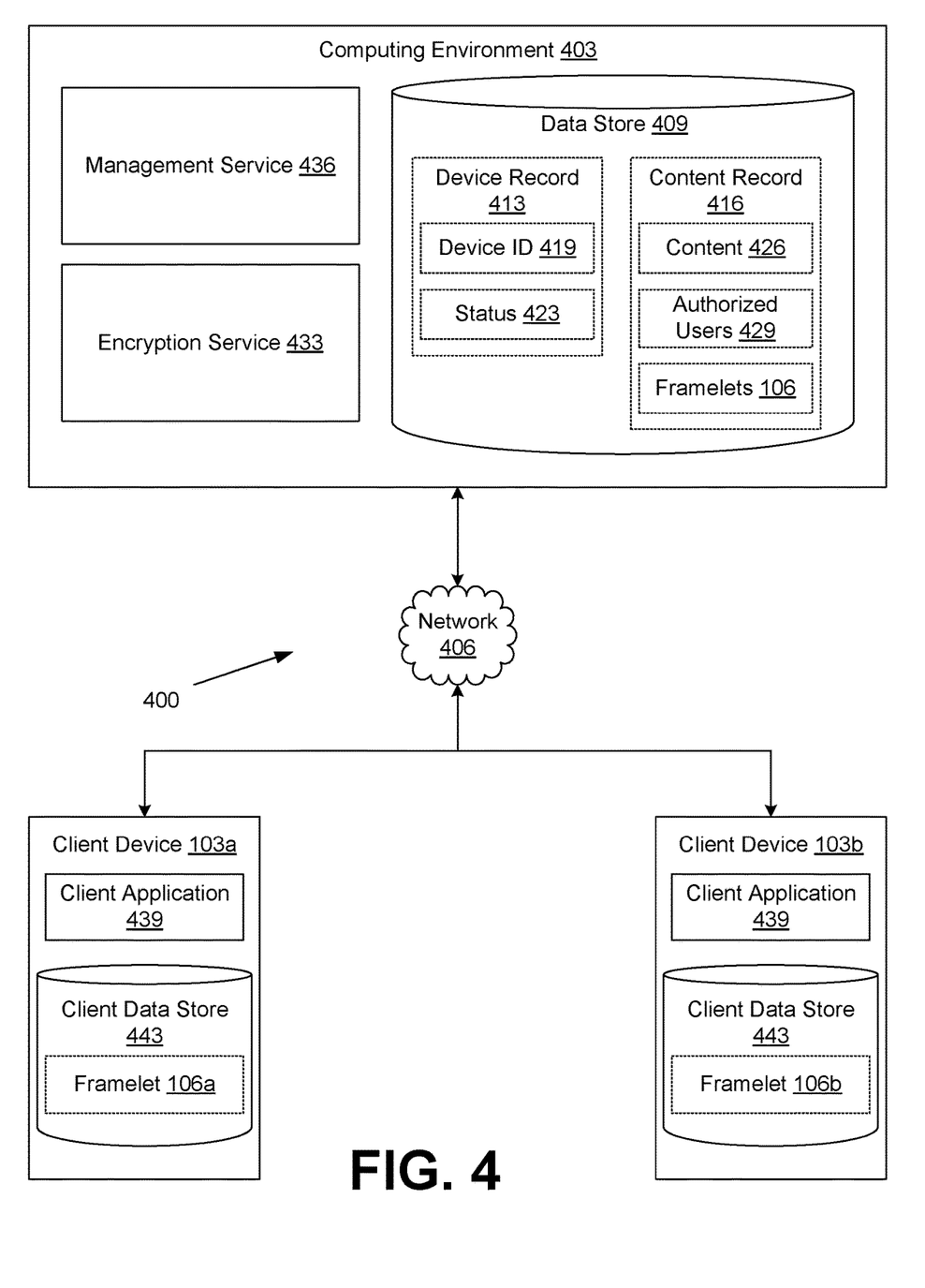
FIG. 4 is a schematic block diagram of a network environment various examples of the disclosure.

With reference to FIG. 4, a schematic block diagram of a networking environment 400 according to various examples of the present disclosure is depicted. The networked environment 400 includes a computing environment 403 and two or more client devices 103a and 103b, which are in data communication with each other via a network 406. The network 406 includes the Internet, intranets, extranets, wide area networks (WANs), local area networks (LANs), wired networks, wireless networks, or other suitable networks, etc., or any combination of two or more networks. For example, the networks can include satellite networks, cable networks, Ethernet networks, and other types of networks.

The computing environment 403 can include a server computer or any other system providing computing capability. Alternatively, the computing environment 403 can employ a plurality of computing devices that can be arranged in one or more server banks or computer banks or other arrangements. The computing devices can be located in a single installation or can be distributed among many different geographical locations. For example, the computing environment 403 can include a plurality of computing devices that together can include a hosted computing resource, a grid computing resource, or any other distributed computing arrangement. In some cases, the computing environment 403 can correspond to an elastic computing resource where the allotted capacity of processing, network, storage, or other computing-related resources can vary over time. Various applications or other functionality can be executed in the computing environment 403 according to various embodiments.

Also, various data is stored in a data store 409 that is accessible to the computing environment 403. The data store 409 can be representative of a plurality of data stores 409 as can be appreciated. The data stored in the data store 409 can include one or more device records 413, one or more content records 416, and potentially other data.

Each device record 413 can correspond to at least one client device 103, such as client device 103a or client device 103b. Each device record 413 can include a device identifier 419 that can link the device record 413 to a particular client device 103. Each device record 413 can also include a status 423 to indicate the status of the corresponding client device 103. Each device record 413 can also include a current user of the client device 103.

A device identifier 419 can represent an identifier that uniquely identifies a client device 103. For example, a device identifier 419 can represent a media access control (MAC) address of a network interface for a client device 103. In another example, a device identifier 419 can represent a serial number of a client device 103. As another example, the device identifier 419 can correspond to international mobile equipment identity (IMEI) number of a cellular modem, radio, or similar interface of the client device 103.

A status 423 can represent a current status of the client device 103. As an example, a status 423 can represent the type of client device 103 (e.g. personal device vs. company owned device), the identity of the owner of the client device 103, or a current user of the client device 103. A status 423 can also represent the location of the client device 103. In some instances, the status 423 can represent whether the client device 103 is connected to a particular network (e.g. internal network, external network, Wi-Fi, cellular network, or other network). Other types of status indications can also be recorded for the status 423 of the client device 103 associated with the device record 413.

A content record 416 can represent data associated with user accessible content. A content record 416 can include a reference or link to specific content 426. A content record 416 can also include a list of authorized users 429 that are allowed to access or view the content 426. A content record can also include individual framelets 106 that, when properly aligned, allow the content 426 to be viewed.

The components executed on the computing environment 403 can include an encryption service 433, a management service 436, and other applications, services, processes, systems, engines, or functionality not discussed in detail herein. The encryption service 433 can generate one or more framelets 106 from content 426 according to the various approaches discussed in this application. The management service 436 can determine whether the client devices 103a and 103b are authorized to receive individual framelets 106. In some instances, the client devices 103a and 103b may be enrolled with the management service 436 to facilitate determinations regarding whether one or both of the client devices 103a and 103b are authorized to receive the individual framelets 106.

The client device 103 is representative of a plurality of client devices 103 that can be coupled to the network 406. The client device 103 can include a processor-based system, such as a computer system. The computer system can include a desktop computer, a laptop computer, a personal digital assistant, a cellular telephone, a smartphone, a set-top box, a music player, a web pad, a tablet computer system, a game console, an electronic book reader, a wearable computing device, an augmented reality or virtual reality device, or another device with like capability.

The client device 103 can execute various applications such as a client application 439 or other applications. The client application 439 can be executed by a client device 103 to retrieve individual framelets 106 from the computing environment 403 and render the framelets 106 on a display of the client device 103. The client device 103 can also execute applications beyond the client application 439 such as email applications, social networking applications, word processors, spreadsheets, or other applications.

The client device 103 can also include a client data store 443 that stores various types of data locally on the client device 103. The client data store 443 can include a local database, data stored locally in a memory of the client device 103, as well as various other types of data stores. Various types of data can be stored in the client data store 443. This can include a framelet 106, as previously described above.

Next, a general description of the operation of the various components of the networking environment 400 is provided. To begin, a user can register one or more client devices 103a and 103b to be overseen by the management service 436. As part of the enrollment process, a corresponding device record 413 can be created by the management service 436 for each client device 103 that is enrolled. A user can enroll or otherwise register a client device 103 with the management service, for example, by entering information about the client device 103 (e.g. device make, model, serial number, and similar information) into a web page. However, in some instances a user can enroll his or her client device 103 automatically, for example, by installing a management client application or a management configuration profile onto the client device 103. In such instances, the management client application can connect to the management service 436 and automatically provide the necessary information to the management service 436 to complete enrollment of the client device 103.

Subsequently, a user sends a request from either client device 103a or client device 103b to the management service 436 to view content 426. The management service 436 validates the request and determines whether the user is one of the authorized users 429 allowed to access the content 426. For example, the management service 436 may determine whether a username and password, a certificate, a device identifier 419, or similar authentication data included with the request is included in the list of authorized users 429 for the content.

If the user is authorized to receive the content 426, then the encryption service 433 generates a plurality of framelets 106 from the content 426. For example, the encryption service 433 can generate two or more framelets 106 that allow a user to view the content when the framelets 106 are overlaid or aligned with each other. In some examples, the encryption service 433 can generate the framelets 106 ahead of time (e.g. when the content 426 is first saved to the data store 409) and cache the framelets 106 in the data store 409 in association with the content 426.

The management service 436 then sends a framelet 106 to each client device 103 currently associated with the user. For example, the management service 436 can send a first framelet 106a to the first client device 103a and a second framelet 106b to the second client device 106b.

Each client device 103 stores the framelet received from the management service 436 in the client data store 443. When a user attempts to view the content 426, each client device 103 displays its respective framelet 106. When a user aligns or overlays the framelets 106 correctly, the content 426 becomes visible to the user.

Figure 5:
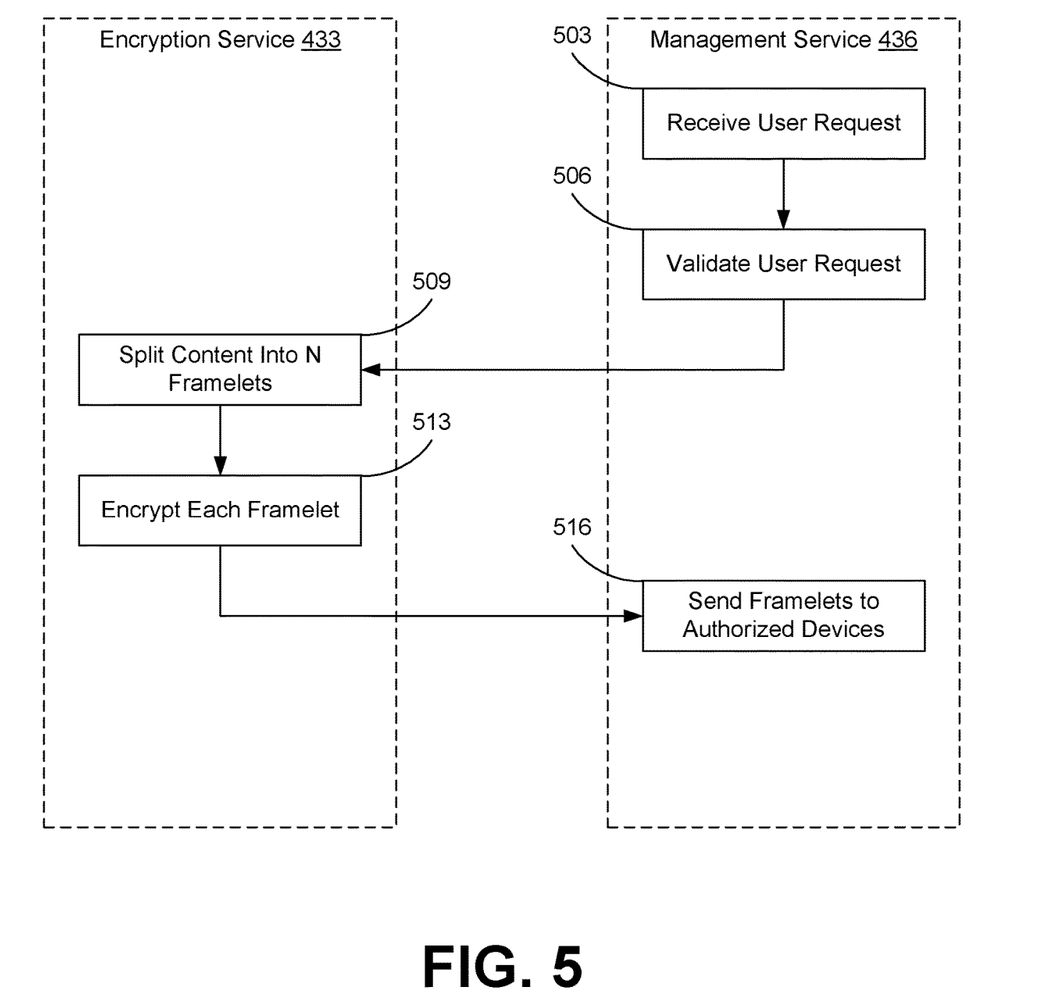
FIG. 5 is a sequence diagram illustrating one example of functionality according to various examples of the disclosure.

Referring next to FIG. 5, shown is a sequence diagram that provides one example of the operation of portions of the encryption service 433 and the management service 436. As an alternative, the sequence diagram of FIG. 5 can be viewed as depicting an example of elements of a method implemented in the networked environment of FIG. 4.

Beginning with step 503, the management service 436 receives a request from a user's client device 103 for content 426. When receiving the request, the management service 436 can parse or otherwise process the request to determine the identity of the user sending the request, the client device 103 from which the request was sent, and potentially extract additional information.

Moving on to step 506, the management service 436 validates the request from the user's client device 103 for the content 426. For example, the management service 436 can determine whether the user is one of the authorized users 429 allowed to view or otherwise consume the content 426. The management service 436 may, for example, compare a username and password, a device identifier 419, a certificate, or similar authentication information to the data stored in the list of authorized users 429. If the corresponding username and password, device identifier 419, certificate, or similar authentication information is included in the list of authorized users 429, then the management service 436 can conclude that the user is authorized to view the content 426 associated with the content record 416. As another example, the management service 436 can verify whether each client device 103 to which a framelet 106 of the content 426 will be sent is associated with the user. For example, the management service 436 may query the status 423 associated with each client device 103 to determine whether each client device 103 is associated with the user.

Referring next to step 509, the encryption service 509 splits the content 426 into a plurality of framelets 106. The number of framelets 106 that the content 426 is split into is predefined based on the security requirements for particular implementations of the various embodiments. A smaller number of framelets 106 would require fewer steps for a user to align the framelets 106 in order to view the content 426. However, a larger number of framelets 106 makes it harder for an attacker to gain unauthorized access to the content 426 because there are more framelets 106 that the attacker must retrieve or otherwise access.

In some instances, the framelets 106 can be generated using the following approach. First, the content 426 is converted into a monochrome image. For example, a color picture would be converted into a black and white image. As another example, a frame of a video would be converted into a black and white frame for the video. Each pixel would then be divided into at least four subpixels, although some instances can use a larger number of subpixels. For a black pixel, each of the four subpixels would be shaded black. A first half of the subpixels would be copied or otherwise assigned to a corresponding pixel in a first framelet 106a. A second half of the subpixels would be copied or otherwise assigned to the corresponding pixel in a second framelet 106b. The corresponding pixel in each framelet 106 would therefore comprise four subpixels, two of which were shaded black. However, when the corresponding pixel of the first framelet 106a is overlaid over the corresponding pixel of the second framelet 106b, all four subpixels would appear to be black. For a white pixel, half of the four subpixels would be shaded black. The shaded half of the subpixels would be copied to or otherwise assigned to the corresponding pixel in the first framelet 106a and the second framelet 106b. The corresponding pixel in both framelets would therefore comprise four subpixels, two of which were shaded black. However, when the corresponding pixel of the first framelet 106a is overlaid over the corresponding pixel of the second framelet 106b, half of the subpixels would be white and half of the subpixels would be black, resulting in a pixel that appeared to be gray. The contrast between gray and black pixels when the framelets 106 are overlaid on top of each other allows for features in the image to be distinguished.

In various instances, the framelets can be generated using the following alternative approach. An image, such as one comprising a sequence of text, is split into a plurality of framelets 106. A first framelet 106 can contain the left half of all letters in the sequence. The second framelet 106 can contain the right half of all letters in the sequence. In some instances, the first framelet 106 could also contain a random assortment of left and right halves while the second framelet 106 could also contain a random assortment of left and right halves.

Proceeding to step 513, the encryption service 509 can also encrypt each framelet. For example, the encryption service 509 can use a symmetric encryption algorithm (e.g. AES, DES, Two fish, Serpent, or similar algorithms) or an asymmetric encryption algorithm (e.g. RSA) to encrypt each framelet 106. In these embodiments, an attacker would be unable to reassemble the framelets 106 to reproduce the content 426 without also gaining access to the appropriate encryption keys for the framelets 106. In some examples, the encryption service 509 can use a symmetric key or an asymmetric key pair that has already been provided to the client device 103 (e.g. a pre-shared key). For example, the key may have been previously provided to the client device 103 when it was enrolled with the management service 436. In other examples, the encryption service 509 may use the Diffie-Hellman Key Exchange Protocol, or similar protocols, to negotiate a shared key to be used to encrypt each framelet.

Moving on to step 516, the management service 436 sends a framelet 106 to each device of the authorized user. In some instances, the management service 436 will send a different framelet 106 to a different device (e.g. a tablet and an augmented reality headset). In other instances, the management service 436 can send a different framelet 106 to different users. For example, in some situations a two-man rule may be followed when accessing information (i.e. information cannot be accessed without the cooperation of two authorized individuals). In these situations, sending one framelet 106 to a device of a first user and a second framelet 106 to a device of a second user would allow either user or both users to view the content 426, but only with the cooperation of the other user. For example, if a first user had an augmented reality headset and a second user had a tablet, the first user with the augmented reality headset could only view the content 426 if the second user with the tablet consented and place his or her tablet in the field of view of the first user.

Figure 6:
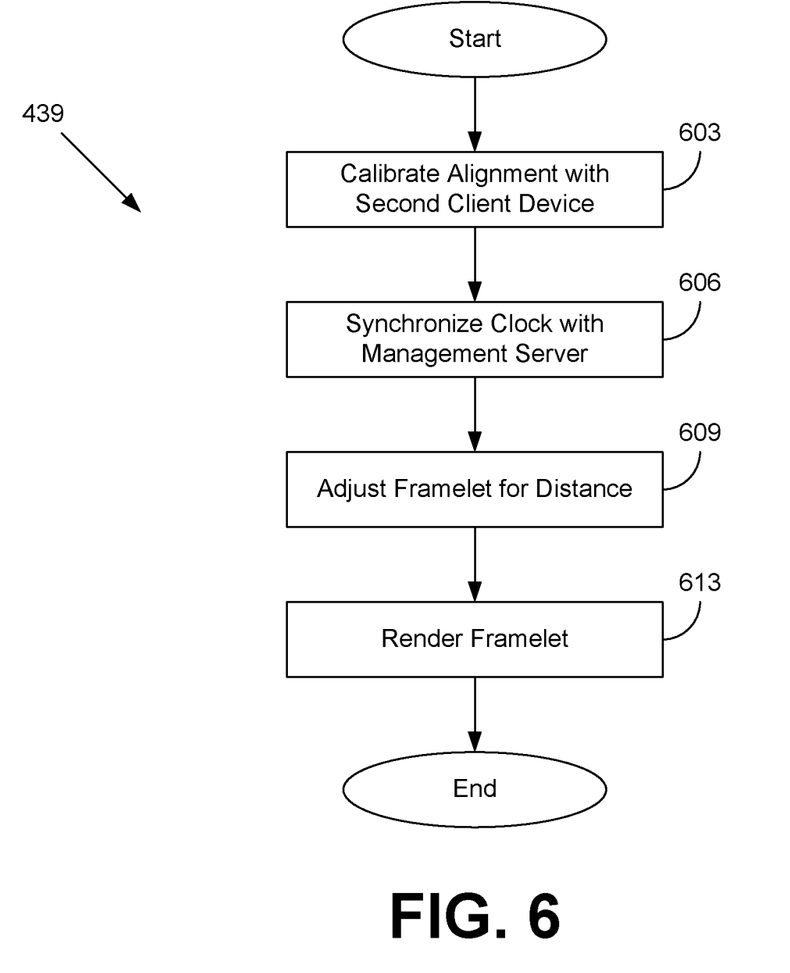
FIG. 6 is a flowchart illustrating one example of functionality according to various examples of the disclosure.

Referring next to FIG. 6, shown is a flowchart that provides one example of the operation of a portion of the client application 439. As an alternative, the flowchart of FIG. 6 can be viewed as depicting an example of elements of a method implemented in the networked environment of FIG. 4.

Beginning with step 603, the client application 439 of the first client device 103a calibrates the alignment with the second client device 103b. As part of the calibration process, the client application 439 can determine the distance between the display of the first client device 103a and the display of second client device 103b. In some instances, the client application 439 can also assist a user in properly aligning the display of the first client device 103a with the display of the second client device 103b. For example, the client application 439 can cause guidelines or other cues on the display of the first client device 103a or the second client device 103b to help a user align the framelets 106 in order to view the content 426.

Proceeding to step 606, the client application 439 can synchronize its clock with the clock of the management service 436. This can be done in order to insure that video content 426 will be viewable. If a first client device 103a were to display framelets 106 for frames of video content 426 at a different time than a second client device 103b, the video content 426 could be unviewable. For example, if the first client device 103a were off by a single frame in its timing for displaying video content 426 relative to the second client device 103b, the correct pair of framelets 106 would never be overlaid over each other. This could render the video content 426 fuzzy or indecipherable.

Moving on to step 609, the client application 439 can adjust the framelet 106 being displayed on the client device 103 based on the distance between the display of the first client device and the display of the second client device. Objects appear smaller the farther they are from a user and larger the closer they are to the user. Accordingly, the framelet 106 being displayed on the client device 103 closest to the user can be reduced in size for the pixels to properly overlap with those displayed on the client device 103 farther from the user. Alternatively, the framelet 106 being displayed on the client device 103 furthest from the user could be enlarged in order for the pixels to properly overlap with those being displayed on the client device 103 closest to the user.

Proceeding next to step 613, the client application 439 causes the framelet 106 to be rendered on the display of the client device 103. The process subsequently ends.

The sequence diagram of FIG. 5 and the flowchart of FIG. 6 show an example of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the sequence diagram and flowchart of FIG. 5 and FIG. 6 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all of these variations are within the scope of the present disclosure.

The client devices 103, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The encryption service 433, the management service 436, client application 439, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

Therefore, the following is claimed:

1. A system for securely providing access to content, the system comprising:
   at least one hardware processor; and
   at least one data store comprising executable instructions, wherein the instructions, when executed by the at least one hardware processor, cause at least one computing device to at least:
   decrypt a first framelet received from a network service, the first framelet comprising a first plurality of subpixels for a respective pixel of a plurality of pixels, the plurality of pixels corresponding to content requested from the network service;
   decrypt a second framelet received from the network service, the second framelet comprising a second plurality of subpixels for the respective pixel of the plurality of pixels; and
   render the first framelet separately from the second framelet on at least one display, the first framelet being visually aligned with the second framelet to reproduce the content, wherein a shade of the respective pixel is reproduced based on the first plurality of subpixels being visually aligned with the second plurality of subpixels.

2. The system of claim 1, wherein the first framelet and the second framelet are rendered on separate areas of a single optical head-mounted display.

3. The system of claim 1, wherein the first framelet and the second framelet are rendered on separate optical head-mounted displays of a single headset.

4. The system of claim 1, wherein the first framelet is visually aligned with the second framelet based on stereopsis.

5. The system of claim 1, wherein the first framelet is overlaid with the second framelet.

6. The system of claim 1, wherein the instructions, when executed by the at least one hardware processor, further cause the at least one computing device to at least: verify that the computing device is associated with a user account that is authorized to view the content.

7. The system of claim 1, wherein the first framelet is decrypted based on a symmetric encryption key or an asymmetric encryption key.

8. A computer-implemented method for securely providing access to content, the method comprising:
   decrypting a first framelet received from a network service, the first framelet comprising a first plurality of subpixels for a respective pixel of a plurality of pixels, the plurality of pixels corresponding to content requested from the network service;
   decrypting a second framelet received from the network service, the second framelet comprising a second plurality of subpixels for the respective pixel of the plurality of pixels; and
   rendering the first framelet separately from the second framelet on at least one display, the first framelet being visually aligned with the second framelet to reproduce the content, wherein a shade of the respective pixel is reproduced based on the first plurality of subpixels being visually aligned with the second plurality of subpixels.

9. The computer-implemented method of claim 8, wherein the first framelet and the second framelet are rendered on separate areas of a single optical head-mounted display.

10. The computer-implemented method of claim 8, wherein the first framelet and the second framelet are rendered on separate optical head-mounted displays of a single headset.

11. The computer-implemented method of claim 8, wherein the first framelet is visually aligned with the second framelet based on stereopsis.

12. The computer-implemented method of claim 8, wherein the first framelet is overlaid with the second framelet.

13. The computer-implemented method of claim 8, further comprising:
verifying that the computing device is associated with a user account that is authorized to view the content.

14. The computer-implemented method of claim 8, wherein the first framelet is decrypted based on a symmetric encryption key or an asymmetric encryption key.

15. A non-transitory computer-readable medium storing executable instructions for securely providing access to content, wherein the instructions, when executed by at least one processor, cause at least one computing device to at least:
decrypt a first framelet received from a network service, the first framelet comprising a first plurality of subpixels for a respective pixel of a plurality of pixels, the plurality of pixels corresponding to content requested from the network service;
decrypt a second framelet received from the network service, the second framelet comprising a second plurality of subpixels for the respective pixel of the plurality of pixels; and
render the first framelet separately from the second framelet on at least one display, the first framelet being visually aligned with the second framelet to reproduce the content, wherein a shade of the respective pixel is reproduced based on the first plurality of subpixels being visually aligned with the second plurality of subpixels.

16. The non-transitory computer-readable medium of claim 15, wherein the first framelet and the second framelet are rendered on separate areas of a single optical head-mounted display.

17. The non-transitory computer-readable medium of claim 15, wherein the first framelet and the second framelet are rendered on separate optical head-mounted displays of a single headset.

18. The non-transitory computer-readable medium of claim 15, wherein the first framelet is visually aligned with the second framelet based on stereopsis.

19. The non-transitory computer-readable medium of claim 15, wherein the first framelet is overlaid with the second framelet.

20. The non-transitory computer-readable medium of claim 15, wherein the instructions, when executed by the at least one processor, further cause the at least one computing device to at least: verify that the computing device is associated with a user account that is authorized to view the content.

\* \* \* \* \*